F. HULBERG.
COMBINED HEARSE AND PASSENGER VEHICLE.
APPLICATION FILED OCT. 16, 1908.
919,868.
Patented Apr. 27, 1909.
2 SHEETS—SHEET 1.
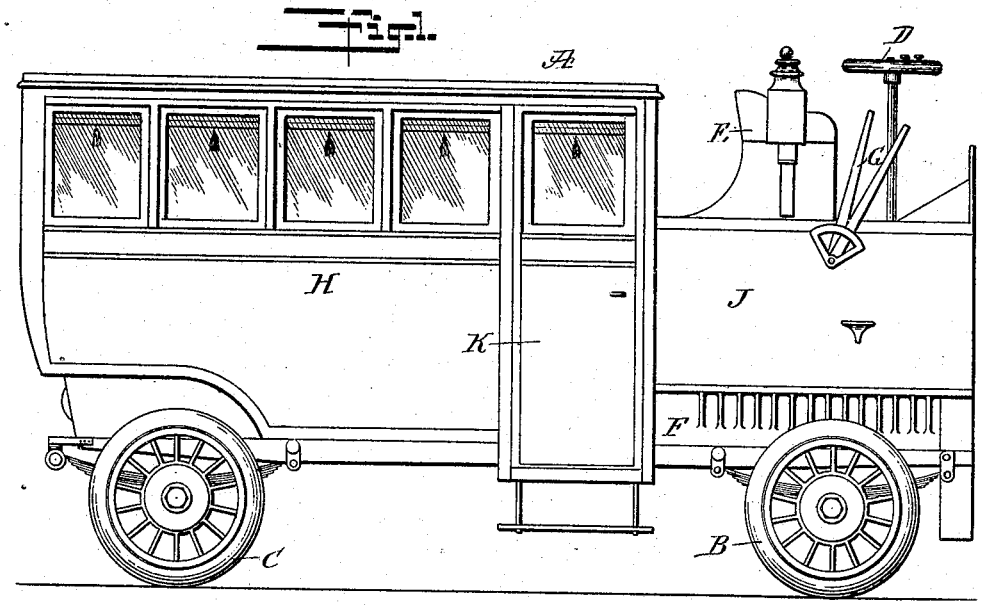
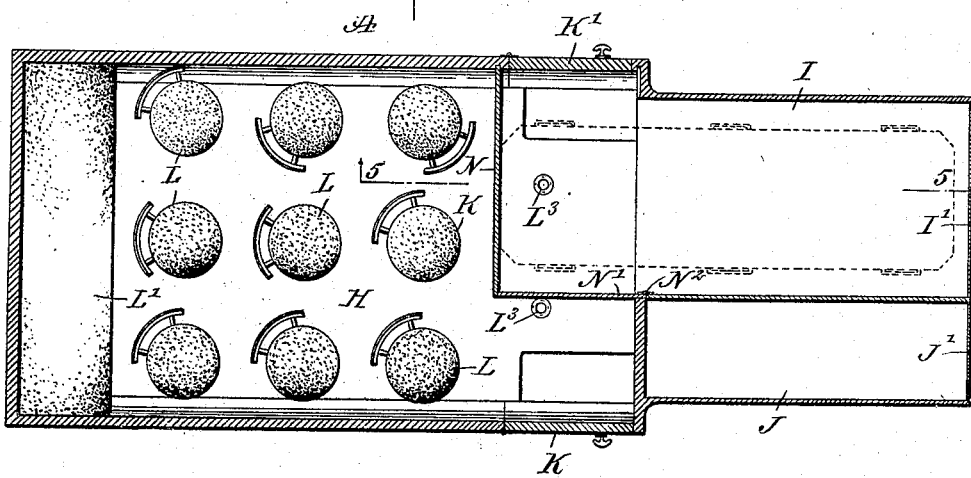
WITNESSES
INVENTOR
Fred Hulberg
BY
ATTORNEYS
THE NORRIS PETERS CO., WASHINGTON, D.C.

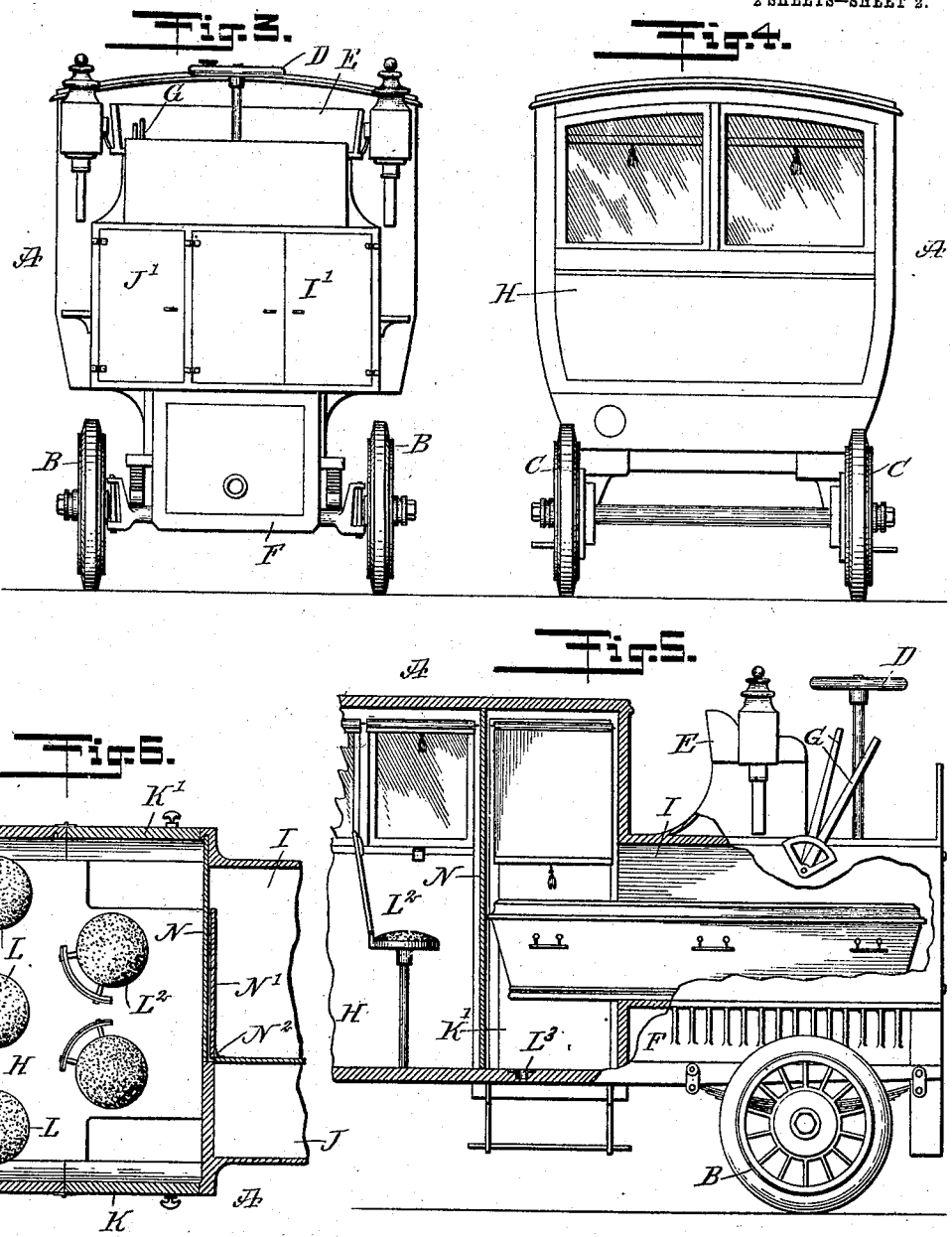

UNITED STATES PATENT OFFICE.

FRED HULBERG, OF NEW YORK, N. Y.

COMBINED HEARSE AND PASSENGER-VEHICLE.

No. 919,868.  Specification of Letters Patent.  Patented April 27, 1909.

Application filed October 16, 1908. Serial No. 457,973.

*To all whom it may concern:*

Be it known that I, FRED HULBERG, a citizen of the United States, and a resident of the city of New York, borough of Manhattan, in the county and State of New York, have invented a new and Improved Combined Hearse and Passenger - Vehicle, of which the following is a full, clear, and exact description.

The invention relates to power-driven vehicles, such as automobiles, and its object is to provide a new and improved combined hearse and passenger vehicle, arranged to accommodate a coffin and flowers in one compartment and passengers in a separate compartment.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1 is a side elevation of the improvement; Fig. 2 is a sectional plan view of the same; Fig. 3 is a front elevation of the same; Fig. 4 is a rear end view of the same; Fig. 5 is a longitudinal sectional elevation of the improvement on the line 5—5 of Fig. 2; and Fig. 6 is a sectional plan view of part of the improvement and showing the passenger compartment enlarged to accommodate more passengers on the return journey.

The combined hearse and passenger vehicle is power-driven, the same as automobiles and like vehicles now in use, and the body A of the said combination hearse and passenger vehicle is mounted on front or steering wheels B, B and rear or driving wheels C, C, the front or steering wheels B, B being steered by the operator manipulating a suitable steering mechanism D, arranged within convenient reach of the operator seated on the seat E, and the vehicle is propelled by a motor F, also under the control of the operator manipulating the usual stop, starting and speed-controlling devices G.

The body A of the vehicle is divided to form a passenger compartment H, a coffin compartment I and a fuel compartment J, for containing a gasolene tank or the like. The passenger compartment H is preferably in the form of a large coupé and occupies the middle and rear portion of the body A, and access to the said passenger compartment H is had by doors K and K' arranged at opposite sides of the vehicle at the front end of the coupé, as plainly indicated in the drawings. Within the passenger compartment H are arranged chairs L, preferably mounted to be turned, and in the rear of the compartment is arranged a fixed transverse seat L', for accommodating a number of passengers (see Fig. 2).

The coffin compartment I and the fuel compartment J are arranged in the front of the passenger compartment H, and below the said compartments is arranged the motor F, and above the said compartments is arranged the seat E. The compartments I and J are provided at their front ends with doors I' and J', to give access to the said compartments, and the coffin compartment I opens at its rear end into the passenger compartment H at one side, so as to accommodate long coffins, as indicated in Figs. 2 and 5. Now the extension of the coffin compartment I into the passenger compartment H is closed by movable partitions N and N', of which the partition N' is preferably hung on hinges $N^2$, to permit of bringing the partition N forwardly into the position shown in Fig. 6, and the partition N is adapted to be moved bodily forward against the front wall of the passenger compartment H, so as to completely close the opening of the coffin compartment I into the passenger compartment H, as will be readily understood by reference to Fig. 6. Thus after the coffin has been removed from the compartment I the partitions N and N' are moved to the front, as mentioned and shown in Fig. 6, so that the passenger compartment H is extended to its full size, and additional chairs $L^2$ may be mounted in suitable sockets $L^3$ arranged in the bottom of the passenger compartment H, thus accommodating two more persons on the return or home journey of the vehicle.

By reference to Figs. 2 and 5 it will be noted that when the partitions N and N' are used, access to the interior of the passenger compartment H is had only by way of the door K, while the other door K' opens into the extension of the coffin compartment I. Now the opening of the coffin compartment I into the extension is a distance above the bottom of the passenger compartment H and a distance from the top thereof, as plainly shown in Fig. 5, so that the space in the extension above and below the rear end of the coffin can be utilized for the storing of flowers and the like, as access to the extension is had by way of the door K'.

It is understood that for short coffins, such as are used for children, it is not necessary to extend the coffin compartment I as the latter is then of sufficient length to accommodate a short coffin, but for the coffins of adults it will be necessary to make use of the partitions N and N', to form the extension, as above explained.

By reference to Figs. 2, 3 and 6, it will be noticed that the fuel compartment J is arranged alongside the coffin compartment I, thus utilizing all the space of the front portion of the body A and at the same time giving the vehicle a neat and symmetrical appearance and accommodating the motor F and the seat E as well as the mechanisms D and G previously mentioned.

Having thus described my invention, I claim as new and desire to secure by Letters Patent:—

1. A combined hearse and passenger vehicle having a compartment for accommodating passengers and a compartment for containing a coffin, arranged at one end of the passenger compartment and opening into the same and means for forming an extension of the coffin compartment in the passenger compartment.

2. A combined hearse and passenger power vehicle having a body divided to form a compartment for passengers, a coffin compartment, and a fuel compartment, the said coffin and fuel compartments being arranged in front of the said passenger compartment and extending longitudinally one alongside the other.

3. A combined hearse and passenger vehicle having a body divided to form a compartment for passengers, and a coffin compartment, the said passenger compartment having removable partitions for forming in the same an extension of the coffin compartment.

4. A combined hearse and passenger vehicle having a body divided to form a compartment for passengers, a coffin compartment opening at its rear end into the said passenger compartment, and partitions removably held in the said passenger compartment, whereby the coffin compartment can be lengthened or shortened.

5. A combined hearse and passenger power vehicle, provided with a vehicle body divided to form a passenger compartment having side doors, a coffin compartment in front of the said passenger compartment and opening at its rear end into the said passenger compartment at a point intermediate the bottom and top of the passenger compartment at one side thereof, and removable partitions in the said passenger compartment for forming an extension of the said coffin compartment.

6. A combined hearse and passenger power vehicle provided with a vehicle body divided to form a passenger compartment having side doors, a coffin compartment in front of the said passenger compartment and opening at its rear end into the said passenger compartment at a point intermediate the bottom and top of the passenger compartment at one side thereof, and removable partitions in the said passenger compartment for forming an extension of the said coffin compartment, one of the said doors opening to the said extension.

7. A combined hearse and passenger power vehicle provided with a vehicle body divided to form a passenger compartment having side doors, a coffin compartment in front of the said passenger compartment and opening at its rear end into the said passenger compartment at a point intermediate the bottom and top of the passenger compartment at one side thereof, and removable partitions in the said passenger compartment for forming an extension of the said coffin compartment and for closing the opening of the coffin compartment into the passenger compartment.

8. A combined hearse and passenger vehicle, having a passenger compartment and a coffin compartment at one end of the passenger compartment and having one end opening into the said passenger compartment, and movable partitions for forming an extension of the coffin compartment in the passenger compartment, one of the said partitions being hinged and the other adapted to be moved bodily.

In testimony whereof I have signed my name to this specification in the presence of two subscribing witnesses.

FRED HULBERG.

Witnesses:
 VAN CLEEF BISHOP,
 THOMAS JEFFERSON WORMAN.